April 20, 1965     F. J. KOUBEK     3,179,531
METHOD OF COATING A LAMINATED PLASTIC STRUCTURE
Filed Jan. 31, 1961
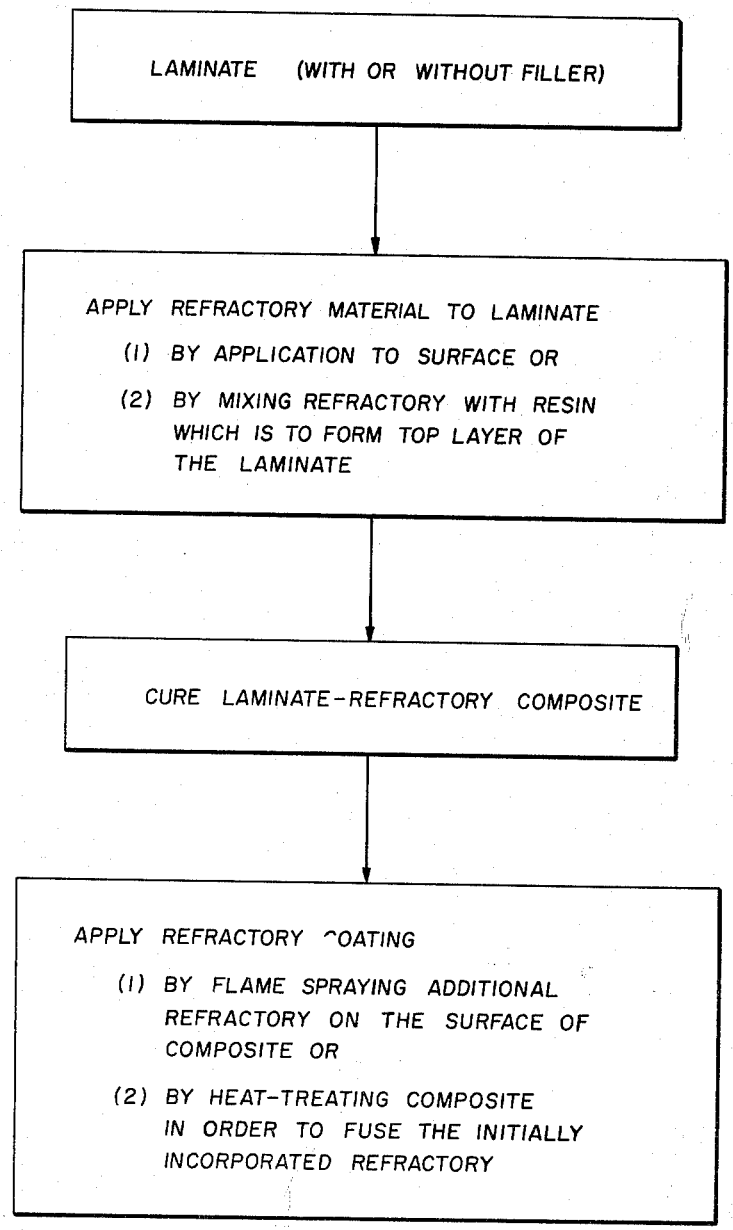
INVENTOR
Francis J. Koubek
BY
ATTORNEY 3,179,531
METHOD OF COATING A LAMINATED PLASTIC STRUCTURE
Francis J. Koubek, Catonsville, Md., assignor to the United States of America as represented by the Secretary of the Navy
Filed Jan. 31, 1961, Ser. No. 86,257
9 Claims. (Cl. 117—23)
(Granted under Title 35, U.S. Code (1952), sec. 266)

The invention described herein may be manufactured and used by or for the Government of the United States of America for governmental purposes without the payment of any royalties thereon or therefor.

This invention relates to a refractory plastic composite structure which is suitable for use in construction in the area of aircraft and missile design where severe conditions of temperature and abrasive action must be met. More specifically, the invention is directed to a composite material which is useful as a material of construction for radomes on high speed aircraft and missiles.

Reinforced plastics have been the standard material for use in radomes operating in subsonic flight regions. Such plastics possess the advantages of being very light and relatively simple to fabricate and furthermore have excellent dielectric properties. However, with the event of high speed aircraft and missiles, such plastics have become inadequate because of structural weaknesses associated with heat resulting from aerodynamic heating. Of more importance is the total inadequacy of reinforced plastics to withstand the severe rain erosion associated with high speed flight through natural rainfall. Rubber coatings applied thereto have been used successfully to combat such erosion in moderate speed aircraft, but are not adequate at higher speeds. Certain refractory materials such as aluminum oxide have been found to be quite resistant to high speed rain and environmental conditions. However, these materials are very difficult and expensive to fabricate; they are brittle and are susceptible to thermal shock, and their high density imposes an unacceptable weight penalty.

Attempts have previously been made to create a plastic ceramic composite by flame spraying a ceramic coating over a reinforced plastic substrate. However, these coatings display inferior rain erosion resistance due to poor bonding of the substrate, lack of stiffness of the substrate which caused the coating to crack, and a non-uniform porous rough coating.

It is therefore an object of this invention to provide a material for use in radomes etc. which has superior rain erosion resistance than prior art material.

Another object is to provide a material for constructing radomes etc. which has superior heat resistant qualities to the prior art.

Still another object is to provide a material which can be made, a material having the aforesaid qualities and advantages which can be made relatively cheaply and simply.

Other objects and many of the attendant advantages of this invention will be readily appreciated as the same becomes better understood by reference to the following detailed description of the flow diagram illustrated in the drawing.

The objects of this invention are accomplished by first preparing a laminated plastic structure as is well known in the art. The laminated plastic structure is formed of alternate layers of a resinous material and layers of fiberglass. The resinous material employed must be heat resistant, and the term "heat resistant material" is defined to mean hereinafter, a material selected from the class of polyester resins and phenolic resins. Once such a laminated structure has been built up to the desired thickness a hard coating of refractory material is then applied. The term "refractory material" is hereinafter defined to mean well known refractory oxides, carbides and borides.

The coating is formed upon the laminated structure by incorporating refractory material in the top most resinous layer of the laminated structure while the resin is still in an uncured state. Refractory material is divided and comminuted and is either mixed evenly with the resin forming the top layer before application, or is applied to the surface of the uncured resin forming the top layer of the laminated structure. The resin is then cured by techniques which are well known and understood in the art. Thus refractory material becomes firmly embedded in the surface of the top layer of material with some of this refractory material protruding from the surface thereof. The surface thus prepared is ready for subsequent treatment which will result in the final hard coating.

The surface as just described is ready for flame spraying at this point. In the flame spraying the same refractory material is sprayed upon the surface as is incorporated in the surface. The refractory material embedded in the surface of the resin forms a much better base for the adhesion of the flame sprayed refractory material than the resin alone.

Alternatively, the surface as prepared in the immediately preceding paragraph is heat treated so as to cause the refractory material protruding from the surface of the resin to fuse, run together, and thus form a continuous coating over the surface of the resin. Due to the great difference in the degradation temperature of the resin and the melting point of the refractory material, this surface heating must be rapid in order to prevent excessive charring of the resinous material. It is preferable in some applications to subject the surface to the action of heat from an electric arc because the arc produces very high temperatures and the heating of the refractory material is very rapid. For some applications, however, the surface is subjected to the action of a blow torch.

To provide backing material with sufficient stiffness to support the refractory coating, it is desirable to incorporate in the resin throughout the composite structure a filler material of the same refractory material as is used for the refractory coating. It is desirable that the backing and the coating have as nearly as possible the same modulus of elasticity and the incorporation of the refractory material as aforesaid. However, alternative methods may be employed to gain this result such as the provision of stiffening members.

Test specimens were made of 12" x 12" x 3/16" plates with sixteen plies consisting of alternate layers of a polyester resin and glass cloth. The plies were laid out in the conventional manner which consists of alternately stacking layers of resin and cloth on top of the other. Fused alumina was ground and screened through a 325 mesh screen. The material thus screened was then applied on the surface of the uncured laminate in the amount of 50 to 200 grams. The specimen was then placed in a hydraulic press and cured at 20 p.s.i.g. for four to six hours and allowed to set overnight. This was followed by post curing at 175° F. for four hours.

The bonding strength between the bonding filler and a laminate was evaluated by cementing 1/2" x 1/2" steel bars to either side of specimens cut from the large plates. This assembly was mounted on a testing machine and the force required to separate the ceramic and the plastic phases was measured. In addition specimens from the 200 gram plate were flame sprayed with approximately 10 mils of alumina and these were also tested. These results are given in Table I which follows:

*Table I*

| Specimen | Bond Strength, p.s.i. | Number of Specimens |
|---|---|---|
| Flame sprayed laminate | 40 | 5 |
| 50 gram filled laminate | 2,270 | 4 |
| 100 gram filled laminate | 2,610 | 3 |
| 200 gram filled laminate | 680 | 1 |
| Flame sprayed 200 gram filled laminate | 750 | 3 |

As is apparent from the table a marked increase in tensile strength results from the use of applicant's material over the older flame sprayed laminates, the bond strength of which is only 40 p.s.i.

The resulting composite structure offers the desirable properties of both ceramics and plastics. The refractoriness and insulation qualities of the ceramic combined with the low density and ease of fabrication of the reinforced plastic are thus incorporated in the composite.

Obviously many modifications and variations of the present invention are possible in the light of the above teachings. It is therefore to be understood, that within the scope of the appended claims, the invention may be practiced otherwise than as specifically described.

What is claimed is:

1. The method of coating a laminated plastic structure comprising alternate layers of glass cloth and a heat resistant resin selected from the group consisting of polyester resins and phenolic resins which comprises:
   (1) applying refractory material selected from the group consisting of refractory oxides, carbides and borides to the surface of the uncured laminate such that a portion of said material protrudes through the surface of said laminate;
   (2) curing the laminate-refractory composite; and
   (3) applying an outer coating of refractory material to the cured laminate composite, said outer coating being formed from a material identical to that applied to the surface of the uncured laminate.

2. The method of claim 1 wherein said laminated plastic structure contains a filler of the same refractory material used to coat the uncured resin and selected from the group consisting of refractory oxides, carbides and borides.

3. The method of claim 1 wherein step (1) is accomplished by mixing comminuted refractory material with the resin which is to form the top layer of the laminate.

4. The method of claim 1 wherein said composite is postcured at 175° F. for about four hours.

5. The method of claim 1 wherein step (3) is accomplished by flame spraying additional refractory material onto the surface of said composite.

6. The method of claim 1 wherein step (3) is accomplished by heat-treating said composite in order to fuse the incorporated refractory material.

7. The method of claim 1 wherein said refractory material is alumina.

8. The method of claim 6 wherein said heat-treating is accomplished by an electric arc.

9. The method of claim 6 wherein said heat-treating is accomplished by a blowtorch.

References Cited by the Examiner

UNITED STATES PATENTS

| | | | |
|---|---|---|---|
| 682,913 | 9/01 | Coleman | 117—71 |
| 1,521,128 | 12/24 | Robinson | 117—93.1 |
| 2,356,513 | 8/44 | Gonan | 117—70 |
| 2,833,681 | 5/58 | Nelson et al. | 154—43 |
| 2,848,350 | 8/58 | Yaeger | 117—9 |
| 2,864,723 | 12/58 | Fluck et al. | 117—76 |
| 2,895,850 | 7/59 | Robison et al. | 117—76 |
| 2,907,671 | 10/59 | Duvivier | 117—72 |
| 2,924,537 | 2/60 | Wallis et al. | 117—126 |
| 2,977,264 | 3/61 | Shapero et al. | 154—43 |

FOREIGN PATENTS

| | | |
|---|---|---|
| 557,574 | 5/58 | Canada. |

WILLIAM D. MARTIN, *Primary Examiner.*

RICHARD D. NEVIUS, CARL F. KRAFFT,
*Examiners.*